United States Patent
Pacht

[19]

[11] Patent Number: 5,950,650
[45] Date of Patent: Sep. 14, 1999

[54] HIGH PRESSURE REGULATOR

[75] Inventor: Amos Pacht, Houston, Tex.

[73] Assignee: Butterworth Jetting Systems, Inc., Houston, Tex.

[21] Appl. No.: 08/957,848

[22] Filed: Oct. 27, 1997

[51] Int. Cl.⁶ .................................................. F16K 43/00
[52] U.S. Cl. ............................... 137/1; 251/61; 251/359; 251/903; 251/284
[58] Field of Search ........................... 251/61, 61.2, 284, 251/285, 359, 903; 137/1

[56] References Cited

U.S. PATENT DOCUMENTS

| | | |
|---|---|---|
| 2,750,957 | 6/1956 | Tavola . |
| 3,217,742 | 11/1965 | Merrill . |
| 4,620,562 | 11/1986 | Pacht . |
| 5,141,022 | 8/1992 | Black ................................... 251/284 X |
| 5,201,491 | 4/1993 | Domangue .......................... 251/903 X |
| 5,549,277 | 8/1996 | Franz .................................. 251/359 X |

*Primary Examiner*—Kevin Lee
*Attorney, Agent, or Firm*—Lee, Mann, Smith, McWilliams, Sweeney & Ohlson

[57] ABSTRACT

A high pressure regulator is provided with a valve member, a seat member, and an actuator. The axial position of the seat member may be selectively fixed with respect to the body. The valve member is axially moveable with respect to the seat member, and includes a flange member for engaging a shoulder surface on the body for limiting movement of the sealing member relative to the seat member. The sealing member preferably has a very slight taper of less than 10° for maximizing the sealing area with the seat member. A frustro-conical sealing bore in the seat member preferably has a long axial length which is at least 50% of a nominal diameter of the valve member in sealing engagement with an annular seal between the body and the valve member. The cap housing includes an interior deflection surface for deflecting fluid from the seating bore. An improved method of regulating fluid includes selectively adjusting the axial position of the seat member with respect to the body and limiting movement of the sealing member by engagement of the flange member with the shoulder surface on the body.

27 Claims, 2 Drawing Sheets

HIGH PRESSURE REGULATOR

FIELD OF THE INVENTION

The present invention relates to a pressure regulator having a valve member adapted for controlling the flow of high pressure fluid. More particularly, the present invention relates to a high pressure regulator wherein the valve member and seat member provide improved resistance to wear and erosion, and improved control over the pressure differential between the regulator opening pressure and the regulator operating pressure.

BACKGROUND OF THE INVENTION

The development of high pressure hydraulic devices such as water jet cutting and blast cleaning devices has led to equipment intended for operating at fluid pressures in excess of 40,000 psig. Unique problems are encountered devising reliable hydraulic equipment capable of operating at such high pressures. For example, it may be desired to regulate the pump discharge pressure to a substantially constant yet high pressure value regardless of the rate of flow from the pump. It may also be desired to provide several on/off-jetting guns each fluidly connected to a common pump discharge line, with a pressure regulator maintaining the system at a high discharge pressure which is at or below a substantially constant value, so that each gun may be independently operated from the same fluid source.

High fluid operating pressures require that the system components be mechanically sound to withstand the high pressures, but also be sufficiently simple for both cost effective manufacture and easy replacement of those parts which are subject to high rates of erosion and wear due to the high fluid pressure and flow characteristics. A high pressure regulator or regulating valve that is both reliable and relatively simple is difficult to construct because of the high biasing forces that must be applied to bias the valve member in a closed or controlled position. Additionally, the valve and seat of the regulator must be adapted to operate satisfactorily over extended periods of time yet be mechanically cost effective to manufacture and easy to replace. These parameters are addressed by the prior art to a limited extent, but the prior art has not solved these problems in a satisfactory manner.

U.S. Pat. No. 4,620,562 to Pacht discloses a high pressure regulating valve particularly suited for replacement of component parts. The regulating valve includes a closure member with an integral control piston and a conical seating surface cooperable with a complimentary surface on a seat member. The valve closure member is biased in the closed position by an actuating mechanism which includes a pressure gas control piston and cylinder arrangement utilizing a flexible diaphragm for sealing the actuator pressure chamber. The cross-sectional area of the control piston is large enough to minimize the differences in cross-sectional areas on the closure member exposed to pressure fluid between the valve closed and valve open positions, resulting in a reduced variation between the pressure required to open the regulator valve (regulator opening pressure) and the pressure required to maintain the regulator in its normal operating position with the valve at least partially open (regulator operating pressure).

Use of a regulator manufactured in accord with the '562 patent confirms that the area of engagement between the surface areas of the closure member and the seating member is nominal, leading to early wear and fatigue. Moreover, the relative difference between the cross-sectional area of the control piston and the cross-sectional area of the outlet passage results in a reduced yet undesirable variation between the regulator opening pressure and the regulator operating pressure.

The problems encountered by the '562 patent are also found in the regulators disclosed in U.S. Pat. No. 3,217,742 to Merrill and U.S. Pat. No. 2,750,957 to Tavola. For example, the '957 Patent to Tavola discloses an injection valve having a stem with a conical end that cooperates with a seat in an injection nozzle, wherein the area of engagement between the surface areas of the stem conical end and the seat is relatively low, leading to high wear.

A need exists in the prior art to minimize the variance between the valve opening pressure and the valve operating pressure, while maintaining valve integrity and resistance to erosion and wear.

SUMMARY OF THE INVENTION

The present invention is directed to a high pressure regulator and method for improved regulation of a pressurized fluid in a conduit. The regulator includes a body having a longitudinal bore therethrough with this bore surrounding a central body axis. The longitudinal bore includes a valve member end, an axially opposing fluid outlet end, a shoulder surface surrounding the valve member end and an inlet passageway providing fluid communication between the conduit and the longitudinal bore. The shoulder surface surrounding the valve member end is preferably planar and lies within a plane substantially perpendicular to the central body axis.

A seat member is secured to the body and positioned adjacent the opposing fluid outlet end of the longitudinal bore in the body. The seat member has a seating bore therethrough surrounding a central seating bore axis. The seating bore provides fluid communication between the inlet passageway and the fluid outlet end of the longitudinal bore. In a preferred embodiment, the seat member may be threaded to the body such that it is axially adjustable relative to the body. A securing member may be used for rotatably locking the seat member to the body.

A valve member is positioned within the valve member end of the longitudinal bore and is axially moveable therein. The valve member includes a sealing member and an axially opposing flange member that preferably has a planar surface. The sealing member is adapted for sealing with the seat member to at least substantially restrict fluid flow from the inlet passageway to the fluid outlet end of the seating bore. The flange member is adapted to engage the planar shoulder surface of the body for limiting movement of the sealing member relative to the seat member, and more particularly to control the position of the sealing member relative to the seat member when the regulator is closed.

In a preferred embodiment, the sealing member includes a tapered conical exterior surface that is inclined relative to the central seating bore axis at an angle of less than 10 degrees. Likewise, the seating bore has a frustro-conical internal surface configured for sealing engagement with the sealing member. The axial length of the sealing member in sealing engagement with the seat member is preferably at least 50% of a nominal diameter of the valve member when in sealing engagement with an annular seal between the valve member and the body. The seating bore has an inlet port in fluid communication with the longitudinal bore in the body and an outlet port in fluid communication with the inlet passageway. The outlet port has a cross-section in a plane perpendicular to the central seating bore axis less than 10% of a cross-section of the valve member in sealing engagement with the annular seal and in a plane perpendicular to the central body axis.

An actuator is connected to the body above the flange member for exerting a biasing force on the sealing member to force the sealing member toward the seat member, such that increased fluid pressure in the longitudinal bore biases the valve member away from the seat member. In a preferred embodiment, the actuator includes an actuator housing operatively secured to the body, a flexible diaphragm disposed within the actuator housing for exerting the biasing force on the valve member, and an inlet port for inputting a selected fluid pressure within the actuator housing for acting on the diaphragm. A moveable piston is disposed within the actuator housing. The diaphragm acts on the piston which in turn acts on the valve member to bias the valve member toward the seat member. A stop member may be used for limiting movement of the piston away from the body.

A cap housing having a cap passageway in fluid communication with the opposing fluid outlet end of the longitudinal bore is connected to the body. The cap housing may include an interior deflection surface passing through the central seating bore axis for deflecting fluid from the seating bore, and an outlet passage spaced radially from the central seating bore axis for releasing fluid from the cap passageway. The cap housing has an outlet passage axis that is substantially perpendicular to the central seating bore axis.

A plug may be removably secured to the cap portion of the cap housing and includes an end surface defining the internal deflection surface of the cap housing. The plug also includes a plug bore extending to an outer surface of the plug. The plug bore has a plug bore axis that is substantially inclined relative to the central seating bore axis. The entirety of the plug bore is spaced from the end surface, such that the plug bore detects erosion of the plug due to pressurized fluid engaging the end surface.

A method of regulating fluid in a conduit involves the use of a regulator that includes a body having a longitudinal bore therethrough surrounding a central body axis. The longitudinal bore includes a valve member end, an axially opposing fluid outlet end, and an inlet passageway providing fluid communication between the conduit and the longitudinal bore. A seat member is secured to the body and positioned adjacent the opposing fluid outlet end. The seat member has a seating bore therethrough surrounding a central seating bore axis for providing fluid communication between the inlet passageway and the fluid outlet end of the longitudinal bore. A valve member is positioned within the valve member end of the longitudinal bore and is axially moveable therein. The valve member includes a sealing member adapted for sealing with the seat member to at least substantially restrict fluid flow from the inlet passageway to the opposing fluid outlet end. An annular seal provides the seal between the valve member and the body. An actuator is connected to the body for exerting a biasing force on the valve member to force the valve member toward the seat member.

The method includes selectively adjusting the axial position of the seat member with respect to the regulator body and thereby automatically limiting movement of the sealing member for engagement with the seat member by the planar engagement of a flange member on the valve member with a shoulder surface on the body. The seat member may include external threads for mating engagement with internal threads on the body, and the seat member may be rotatably locked to the body when in the desired axial position.

The method may further include removably connecting a cap housing to the body. The cap housing includes a cap passageway in fluid communication with the opposing fluid outlet end of the longitudinal bore, an interior deflection surface passing through the central seating bore axis for deflecting fluid from the seating bore, and an outlet passage spaced radially from the central seating bore axis for releasing fluid from the cap passageway. A plug may be removably secured to the cap portion of the cap housing and includes an end surface defining the internal deflection surface of the cap housing. The plug also includes a plug bore extending to an outer surface of the plug. The entirety of the plug bore is spaced from the end surface. Thus, erosion of the plug due to pressurized fluid engaging the end surface may be detected by observing the release of fluid from the plug bore.

It is a primary object of the present invention is to provide a high pressure regulator for improved regulation of a pressurized fluid in a conduit.

Another object of the invention is a high pressure regulator that has a very low variation between the regulator opening pressure and the regulator operating pressure.

Still another object of the invention is a reliable high pressure regulator with a long life between service and repair operations for component parts, including the valve member and valve seat.

It is a feature of the invention to provide a high pressure regulator with an externally threaded seat member for mating engagement with internal threads on the body for selectively adjusting the axial position of the seat member and thus the seating bore relative to the body.

It is another object of this invention to provide a high pressure regulator with a valve member including a sealing member and axially opposing flange member, wherein the flange member is adapted to engage a shoulder surface on the body for limiting movement of the sealing member for engagement with the seat member, which is selectively fixed relative to the body.

Yet another feature of the invention is a high pressure regulator with a sealing member that has an axial length in sealing engagement with a seat member of at least 50% of a nominal diameter of the valve member that is in sealing engagement with an annular seal. This large surface area engagement between the sealing member and the seat minimizes erosion and wear as the sealing member repeatedly engages the seating bore during operation of the regulator, thereby prolonging the useful life of these components.

Another feature of this invention is a high pressure regulator with a seating bore having an inlet port in fluid communication with a longitudinal bore in the body, and an outlet port in fluid communication with a fluid outlet end of the longitudinal bore. The fluid outlet port has a cross section in a plane perpendicular to a central seating bore axis less than 10% of a cross section of the valve member in a plane perpendicular to a central body axis and in sealing engagement with an annular seal for minimizing the variance between the regulator opening pressure and the regulator operating pressure.

It is another feature of this invention that the sealing member on the valve has a tapered conical exterior surface inclined relative to the central seating bore axis at an angle of less than 10 degrees for increasing the axial length of the sealing member in sealing engagement with the seat member.

Another feature of the present invention is that the shoulder surface surrounding the valve member end of the longitudinal bore and the flange member of the valve member each have planar surfaces for planar engagement.

Yet another feature of this invention is the use of a removable cap housing connected to the body, the cap housing having a cap passageway in fluid communication with the fluid outlet end of the longitudinal bore and an interior deflection surface passing through the central seating bore axis for deflecting fluid from the seating bore. The cap may include a discharge passageway with an axis substantially perpendicular to the central seating bore axis for releasing fluid from the cap housing.

Still another feature of the invention includes a plug removably secured to the cap position of the cap housing, with the plug having an end surface for defining the internal deflection surface of the cap housing. The plug has a plug bore extending to an outer surface of the plug. The entirety of the plug bore is spaced from the end surface, such that the plug bore allows for detecting the escape of fluid from the plug bore and thereby determining the extent of erosion of the plug due to pressurized fluid engaging the end surface.

It is an advantage of the present invention to provide a fluid pressurized actuator connected to the body for exerting a biasing force on the valve member to force the valve member toward the seat member. The actuator may include a stop member for limiting movement of an actuator piston away from the body.

Still another advantage of the invention is the relatively low cost and high reliability of the high pressure regulator.

These and further objects, features and advantages of the present invention will become apparent from the following detailed description, wherein reference is made to the figures in the accompanying drawings.

DETAILED DESCRIPTION OF PREFERRED EMBODIMENTS

Figure 1:
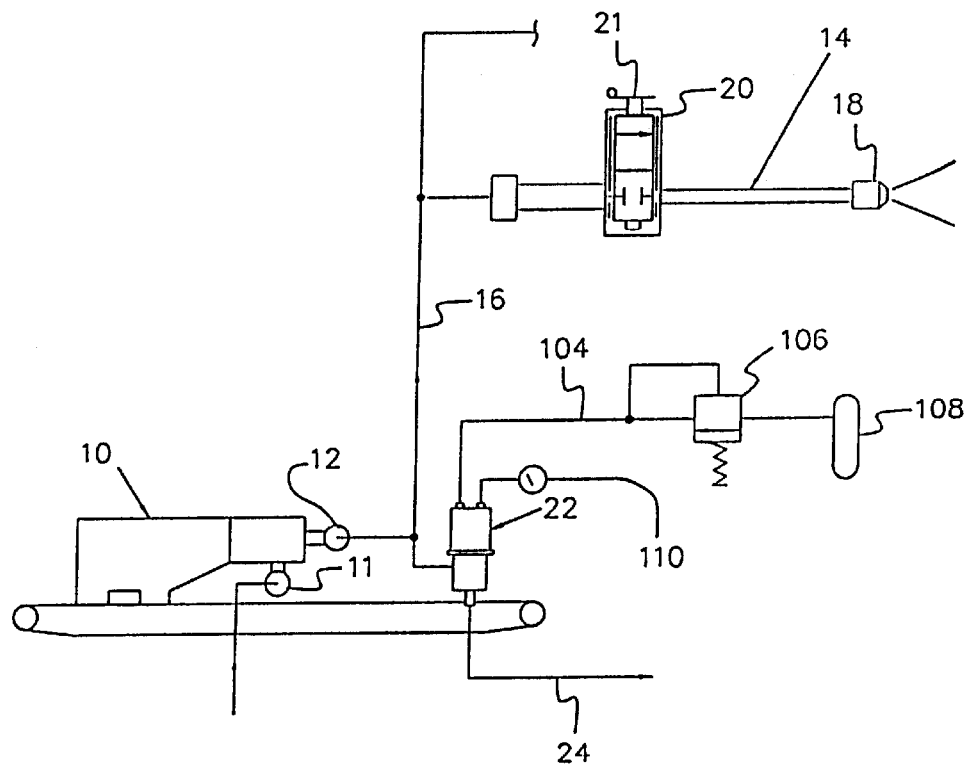
FIG. 1 is a schematic diagram of a high pressure water jet cutting or blast cleaning system including the pressure regulator of the present invention.

With reference to FIG. 1, a schematically hydraulic system includes a high pressure pump 10 which is adapted to be driven by a prime mover (not shown) for pumping liquid such as water from a source (not shown) connected to an inlet manifold 11. The pump 10 may provide the delivery of liquid at pressures in the range of from about 10,000 to 40,000 psi or greater at pump discharge manifold 12. The pump 10 is adapted to be used in conjunction with a high pressure water jet cutting or blast cleaning gun, generally designated as 14. Gun 14 is connected to the pump discharge manifold 12 by way of a flow conduit 16. The jet gun 14 includes a discharge nozzle 18 and an operator actuated shut-off valve 20.

The gun 14 may be actuated to supply a very high velocity stream of water to be used for cutting or blast cleaning in various applications known to those skilled in the art. In particular, the valve 20 is adapted to shut off upon release of its actuating lever 21 to abruptly interrupt flow of high pressure water through the conduit 16. The apparatus illustrated in FIG. 1 is adapted to be used in conjunction with one or several guns 14, although only one gun 14 is shown for illustration purposes. Additional jet guns 14 may be used with the apparatus described and illustrated by merely connecting each additional gun to conduit 16 in a manner readily understandable by those skilled in the art.

The system illustrated in FIG. 1 is adapted to be used in conjunction with an improved high pressure regulator according to the present invention and generally designated as 22. The regulator 22 is also adapted to be connected to the pump discharge conduit 16 and regulates the pressure in the conduit 16 by venting or dumping water through a valve discharge line 24 when the flow through the valve 20 is being throttled or completely shut off. The pressure regulator 22 is thus adapted to maintain a substantially constant discharge pressure in the conduit 16 so that pressure variations do not occur at the guns 14 when in use, and particularly if more than one gun is being used at the same time. The regulation of pressure to minimize the variation in pressure between the regulator opening and the regulator operating cycles is particularly advantageous in hydraulic jet blast cleaning or cutting systems, as well as in hydraulic systems including hydrostatic test equipment used for testing components such as piping, pressure vessels and other pressure fluid devices.

Figure 2:
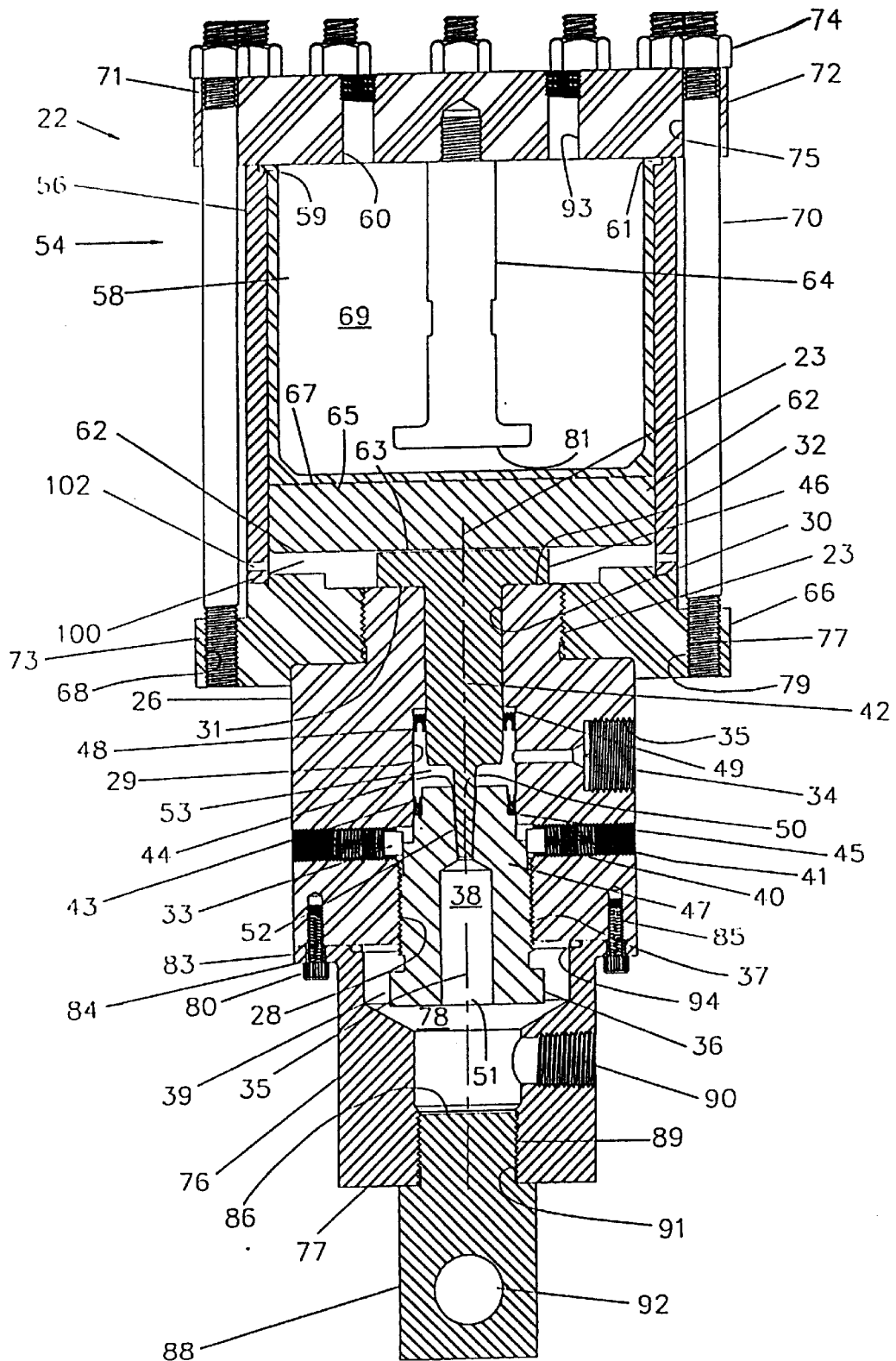
FIG. 2 is a longitudinal cross-sectional view of the pressure regulator generally shown in FIG. 1.

Referring now to FIG. 2, a preferred embodiment of the regulator valve 22 is shown in a longitudinal cross-sectional view which illustrates all the essential components of the regulator. The regulator 22 includes a generally cylindrical body 26 having a longitudinal stepped bore 29 therethrough that surrounds a central body axis 23. The longitudinal bore 29 includes a valve member end 30 on an axially opposing threaded fluid outlet end 28. An inlet passageway 34 in the body 26 provides for fluid communication between the conduit 16 shown in FIG. 1 and the longitudinal bore 29 in the regulator body 26. The inlet passageway 34 is suitably threaded at 35 for receipt of a conduit fitting (not shown) for connecting the regulator valve 22 to the pump discharge conduit 16 or other source of high pressure fluid. A shoulder surface 32 surrounding the valve member end 30 preferably lies within a plane substantially perpendicular to the central body axis 23.

A seat member 36 is releasably secured to the body 26 and may be axially adjusted relative to the central body axis by externally threaded portion 37 that rotably cooperates with the internally threaded fluid outlet end 28 of the longitudinal bore 29. The seat member 36 may be easily rotated by a plurality of flats 39 integrally formed at a distal end of the seat member 36 that extend outside of the longitudinal bore 29 in the body 26. The seat member 36 includes a seating bore 38 formed therethrough that surrounds a central seating bore axis 35. The seating bore 38 provides for fluid communication between the inlet passageway 34 and the fluid outlet end 28 of the body 26. The seating bore 38 has an upper tapered portion discussed subsequently and a lower portion, which is preferably substantially cylindrical.

Once the seat member 36 is selectively positioned within the longitudinal bore relative to the body 26, the seat member 36 may be secured in place by two or more threaded set screws 40 that are positioned about the body 26 for engagement with a respective external engagement surface 33 on the seat member 36. Each set screw 40 passes through a threaded bore 41 extending radially through the body 26 into communication with the longitudinal bore so that the set screws 40 may be adjusted without disassembling the valve 22. A seal 43 and backup seal 45 are positioned between a reduced diameter portion 47 of the seat member 36 and the longitudinal bore in the body 26 for preventing pressurized fluid from escaping through the threaded outlet end 28 of the longitudinal bore or the threaded bores 41 of the body 26 without first passing through the seating bore 38. The seal 43 may be from any commercially available source, such as POLYSEAL™.

A valve member 42 is positioned within the valve member end 30 of the longitudinal bore and is axially movable therein along the central body axis 23. The valve member 42 includes a substantially circular flange member 46 positioned in a plane perpendicular to the central body axis and an opposing longitudinal sealing member 44 at its opposing distal end. The sealing member 44 is tapered for sealing with a corresponding tapered portion of the seating bore 38 of the seat member 36 to at least substantially restrict fluid flow between the inlet passageway 34 and to the opposing distal end 51 of the seating bore 38. The flange member 46 preferably includes a lower planar surface 31 adapted to engage the opposing upper planar shoulder surface 32 of the body 26 for limiting movement of the sealing member 44 relative to the seat 36 and thus the seating bore 38. A seal 48 and backup seal 49 are positioned between the valve member 42 and the longitudinal bore for preventing pressurized fluid from escaping through the valve member end 30 of the longitudinal bore. The annular seals 43 and 48 thus maintain a fluid tight chamber 53 between the valve member 42 and the seat member 36 when the regulator is fully closed.

The regulator of the present invention minimizes replacement of the valve element and sealing member by increasing the sealing area between these components to reduce erosion and wear during valve operating cycles. In a preferred embodiment, the sealing member 44 includes a tapered conical exterior surface that is inclined relative to the central seating bore axis at an angle of less than 10°, preferably less than 8°, and ideally about 5° or less. The tapered portion of the seating bore 38 between the inlet port 50 and outlet port 52 has a frustro-conical internal surface adapted to seat and seal with the sealing member 44. The inlet port 50 is in fluid communication with the chamber 53 and an outlet port 52 is in fluid communication with the distal end 51 of the sealing bore 38. The slight taper of the frustro-conical mating surfaces of the sealing member 44 and seating bore 38 increases the axial length of the sealing member 44 in sealing engagement with the seat member 36 to at least 50%, and preferably at least 75%, of a nominal diameter of the valve member 42 in sealing engagement with the annular seal 48, thereby improving resistance of the valve member and the seat member to wear and erosion and prolonging the life of these components.

Although conventional high pressure regulators may have benefitted from increasing the sealing area between the sealing member 44 and the seating bore for improved resistance to wear, a primary concern with reducing the taper and increasing the axial length of these components is that the sealing member 44 would become lodged in the seating bore 38, thereby creating a high force which had to be overcome for the regulator to open. By significantly reducing this taper, the present invention creates a condition whereby the sealing member could theoretically become lodged or stuck within the seating bore under the urging of an actuating or biasing force acting on the valve member. Conventional regulators thus minimize this problem by using a high tapered angle between the engaged surfaces of the valve member and seat member to prevent the sealing member from becoming stuck or lodged within the seat member. The present invention completely overcomes this problem, however, by incorporating the flange member 46 into the valve member 42, thereby ensuring that the axial position of the sealing member 44 is fixed when in the closed position relative to the body. The seat member 36 may be rotated within the valve body 26 in order to selectively position the seat member 36 relative to the body and thus with respect to the closed sealing member 44. As a result, the taper of the sealing member 44 may be very slight to increase the area of engagement between the sealing member 44 and seating bore 38 for improved resistance to wear and without risking the valve member becoming stuck in the sealing member.

The regulator of the present invention is also designed to minimize the variance between the regulator opening pressure and the regulator operating pressure. As previously noted, the regulator opening pressure is the pressure required to open the regulator when it is fully closed, and the regulator operating pressure is the set pressure of the regulator, i.e., the normal operating pressure of the regulator with the valve elements at least partially open. In prior art regulators, the opening pressure was undesirably higher than the operating pressure, thereby increasing cycling of the valve element when the set operating pressure approximated the upstream pressure to the regulator. This variance between the regulator opening pressure and the regulator operating pressure is to some extent inherent in the design of the regulator. As shown in FIG. 1, when the valve is fully closed the pressure in the chamber 53 is acting upon the full diameter of the valve member 42, less the area of the inlet port 50 of the seat member 36 in sealing engagement with the sealing member 44 of the valve member 42. When the regulator is not fully closed and the sealing member 44 is out of sealing engagement with the valve seat 36, the pressure in the sealing bore 38 is also effectively acting on this additional area, thereby creating additional force which tends to keep the regulator open once the valve member 44 is out of sealing engagement with the seat 36. Accordingly, the regulator opening pressure typically is higher than the regulator operating pressure.

The regulator of the present invention substantially minimizes this variance in two ways. First, the cross-sectional area of the sealing member 44 in sealing engagement with the seat member 36 is reduced. The regulator as shown in FIG. 2 thus has a relatively small diameter sealing member 44 and the corresponding small diameter tapered bore in the sealing seat 36 to minimize the area upon which any pressure in the bore 38 acts when the sealing member is out of sealing engagement with the seat member. In a preferred embodiment, the tapered portion of the sealing bore 38 has an outlet port which in cross-section within a plane perpendicular to the central seating bore axis is less than 10% of the cross-section of the valve member 42 in a plane perpendicular to the central body axis 23 and in sealing engagement with the annular seal 48. In a preferred embodiment, the outlet port 52 at the lower end of the taper bore in the sealing member 36 has a cross-sectional area which is less than $\frac{1}{16}$ th of the cross-sectional area of the valve member 42 in sealing engagement with the annular seal 48. This small diameter and long axial length of the sealing member 44 also creates a condition whereby the sealing member could fracture when forced by the high pressure in the actuator into engagement with the seat member 36. This high force is desirably minimized or limited, however, by engagement of the flange 62 with the body 26, as discussed above, thereby preventing the high actuator force from breaking or fracturing the relatively small diameter sealing member 44.

The second feature which significantly reduces the variance between the regulator opening pressure and the regulator operating pressure includes the ability to closely maintain the axial position of the valve and seat components when the regulator is fully closed so that there is normally a small amount of leakage of fluid through the regulator even when the pressure upstream from the regulator is below the regulator operating pressure. This feature of the invention is described more fully below. For the present, however, it should be understood that by normally allowing some leakage between the sealing member 44 and the seat member 36 even when the regulator is closed, some fluid pressure will continually be present in the sealing bore 38. This fluid pressure in the bore 38 is desirable to the extent that it is continually present to act upon the sealing member 44, thereby minimizing the variance between the regulator opening pressure and the regulator operating pressure.

The regulator 22 is provided with an actuator 54 connected to the body 26 for exerting a biasing force on the valve member 42 and urging the sealing member 44 toward the seating bore 38. The actuator 54 may be selectively pressured to provide a desired biasing force against the valve member 42 so that pressurized fluid upstream from the regulator forces the valve member 42 away from the seat member 36 and to an open position, thereby releasing fluid from the regulator and maintaining a desired pressure to the gun 14. The actuator 54 includes an actuator housing 56 that is preferably sleeve-shaped and secured to the valve body 26. A plurality of threaded studs 70 are provided for securing the actuator housing 56 to the body 26. Each stud 70 is externally threaded at a top end 71 and a bottom end 73, and passes through a corresponding bore 75 in an actuator head cover 72 positioned above the actuator housing 56. The actuator head cover 72 is secured to the actuator housing by a plurality of hex nuts 74 threadably secured to the upper end 71 of each stud 70. The bottom end 73 of each stud is threadably secured within a corresponding internally threaded bore 77 in a cylindrical ring 66 that is positioned below the actuator housing 56. The ring 66 has an internally threaded bore 79 that cooperates with an externally threaded section 23 of the body 26 for operatively connecting the actuator housing 56 to the body 26. This threaded engagement also permits access to the valve member 42 by simply removing the actuator housing from the body 26.

A cylindrical piston 62 is disposed within the actuator housing 56 and is free to move or float therein to engage the top planar face 63 of the valve member 42. A flexible diaphragm 58 is disposed within the actuator housing 56 above the piston 62 and when pressurized provides the actuating or biasing force necessary to maintain the valve member 42 in its closed position. The diaphragm 58 includes an annular rim portion 59 which is adapted to fit in a cylindrical recess 61 formed in the end face of the actuator housing 56. The actuator head cover 72 thus forms a fluid tight seal between the diaphragm 58 and the actuator housing 56. The diaphragm 58 also includes a transverse end wall 65 opposite the annular rim portion 59 which engages the surface 67 of the piston 62. The diaphragm 58 is dimensioned to be in slidable but in a snug fitting relationship within the actuator housing 56 and provides a fluid tight seal forming a pressure filled chamber 69 defined between the diaphragm 58 and the actuator head cover 72. A stop member 64 is disposed in the pressure filled chamber 69 and is threadably secured to the actuator head cover 72 as shown. The stop member 64 includes a cylindrical head portion 81, which is dimensioned to be positioned a short distance from the diaphragm end wall 65 in accordance with the operating characteristics of the regulator valve 22. A compartment 100 is formed between the piston 62 and the ring 66 for receiving any pressurized fluid that has escaped through the valve member end 30 of the longitudinal bore. The pressurized fluid may be released or vented from the compartment 100 through a plurality of passages 102.

The pressure filled chamber 69 may receive an initial charge of any pressurized fluid or gas through an inlet port 60. As shown in FIG. 1, the inlet port 60 fluidly communicates with a conduit 104 that is connected to a pressure source 108 through a constant pressure regulator valve 106. A suitable gas for use in the pressure filled chamber 69 may be compressed air or nitrogen. Since the pressure filled chamber 69 may be initially charged at a desired pressure and cut off from the pressure source 108, it might be desirable to maintain an additional pressure source (not shown) controlled by the regulator 106. A passageway 93 is provided for connecting the pressure filled chamber 69 to a pressure gauge or indicator 110 as shown in FIG. 1.

When the valve member 42 moves from the closed position to the open position, there is a reduction in the volume of the pressure filled chamber 69 as the piston 62 displaces or compresses the diaphragm 58. A pressure increase in the pressure filled chamber 69 provides a force acting on the piston 62 which will be balanced by the force in the chamber 53 acting on the valve member 42. Due to the difference in area, a relatively low pressure of less than several thousand psi in the chamber 69 may be used to operate the regulator at a high pressure of 30,000 psi or more.

A cap housing 76 is preferably connected to the body 26 by a plurality of threaded screws 80 passing through a plurality of corresponding apertures in a flanged end 83 of the cap housing 76. Each screw 80 is threadably secured within a corresponding threaded bore 85 axially extending through a distal end 87 of the body 26. A sealing ring 84 is disposed in a recess 94 in the cap housing 76. The sealing ring 84 provides a seal between the body 26 and the cap housing 76 for preventing pressurized fluid from escaping between the engaged surfaces of the cap housing 76 and body 26. The cap housing also includes a stepped cap passageway 78 that is adapted for fluid communication with the seating bore 38. Passageway 78 is sized for receiving the lower end of the seating member 36. The cap housing 76 further includes an outlet passage 90 spaced radially from the central seating bore axis for releasing pressurized fluid from the cap passageway 78. The outlet passage 90 is internally threaded to enable coupling with the valve discharge line 24 shown in FIG. 1. The outlet passage 90 includes a transverse axis that is substantially perpendicular to the central seating bore axis.

In a preferred embodiment, the cap housing 76 comprises a cap portion 77 and a plug 88. The plug 88 includes a smaller diameter end 89 that is threadably connected to the cap portion 77 at internally threaded distal end 91 of the cap passageway 78. The plug 88 also includes an end surface 86 that defines an internal deflection surface for the cap housing 76. Additionally, the plug 88 may include a plug bore 92 extending to an outer surface of the plug 88. The entirety of the plug bore 92 is spaced from the deflecting end surface 86, such that the plug bore 92 allows for the detection of erosion of the plug 88 by viewing leakage of fluid from the bore 92 due to pressurized fluid engaging the deflecting end surface 86. Preferably, the plug bore 92 has a plug bore axis that is substantially inclined relative to the central sealing bore axis.

Figure 3:
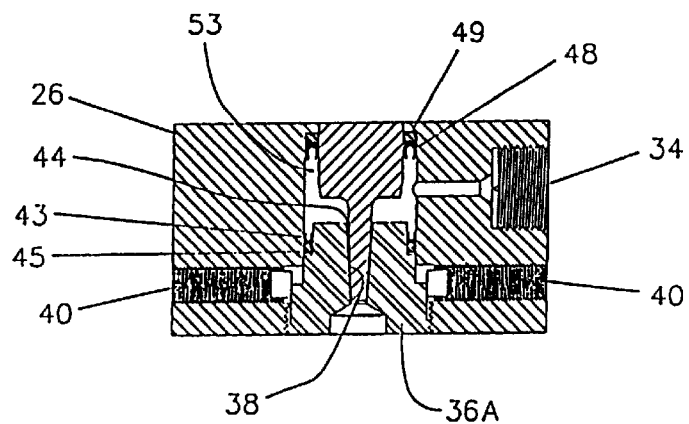
FIG. 3 is an enlarged view of a portion of the regulator shown in FIG. 2, including the valve seat member selectively adjusted with respect to the body and the sealing member when the sealing member is in the closed position.

The operation of the regulator 22 is suggested from the foregoing description. As illustrated in FIG. 1, the regulator 22 is preferably connected to the working fluid flow line or conduit 16 leading from the pump 10 to one or more water blast guns 14. In use, the regulator 22 may be provided with a source of pressurized gas 108 or an initial charge of pressurized fluid may be introduced into the pressure filled chamber 69 and then shut off from the source. One or more jet guns 14 may be operated from the same pump discharge line 16. The working pressure of the guns 14 may be adjusted by setting the pressure in the pressure filled chamber 69. FIG. 3 illustrates the axial adjustment of the seat member relative to the central body axis. Axial movement of the seat member is shown between a first position 36A and a second position 36B.

FIG. 3 is an expanded view of the portion of the regulator shown in FIG. 2, and more particularly illustrates the feature of the axial adjustment of the seat member relative to the central body axis. With the seat member 36 axially adjusted to the position 36A as shown in solid lines in FIG. 3, there is a very small but discernible annular gap or spacing between the outer surface of the sealing member 44 and the inner surface of the tapered portion of the bore 38. When the seat member 36A is rotated and fixed to the body 26 in the position as shown in dashed lines at 36B, the seat member is in fluid tight sealing engagement with the sealing member 44.

A particular feature of the present invention is to selectively position the seat member 36 in substantially the position as shown in 36A, so that there is a very slight gap or spacing between the sealing member 44 and the inner walls of the bore 38, so that a small amount of fluid continually leaks from the regulator. As previously noted, this leakage is desirable to maintain a substantially constant force in the bore 38 of the seat member below the sealing member 44, thereby continually applying an upward force on the sealing member and minimizing the variation between the regulator opening pressure and the regulator operating pressure. According to a preferred method of the invention, this desired spacing or gap is obtained by applying a relatively low fluid pressure, e.g., 3,000 psi, to the inlet passageway 34 in the body, and then slowly rotating the seat member so that it axially moves toward the sealing member 44 until this axial adjustment cuts off any discernible flow of fluid out of the regulator bore 38. During this selective positioning operation, conventional high pressure may be maintained in the chamber 69 so that the sealing member is biased toward the valve seat, with movement of the sealing member being limited by engagement of the flange member 46 with the body. At that stage, the position of the seat member 36 with respect to the sealing member 44 will be substantially in a position as shown at 36B. When in this position, the rotational and thus the axial position of the seat member 36 is fixed with respect to the body by locking down the set screws 40. Assuming for exemplary purposes that nitrogen is input to the actuator chamber 69 to effectively set the regulator operating pressure at 35,000 psi, it should be understood that no fluid will escape from the regulator until the inlet pressure rises above 3,000 psi. Once the pressure to the regulator rises substantially above 3,000 psi and to a level of, for example, 10,000 psi, this increased fluid pressure in the chamber 53 exerts an upward compressive force on the valve element 42, thereby tending to unseat the sealing element from the seating element, and effectively moving these components into a relationship with respect to each other closer to that shown at 36A. As the fluid pressure of the regulator increases, for example, to 30,000 psi, this substantial pressure in the chamber 53 will result in a desired leakage of fluid out the regulator, since the position of the valve member 44 with respect to the seat member 36 will then be substantially shown in solid lines in FIG. 3. This leakage is thus desirable to minimize the variation between the regulator opening pressure and the regulator operating pressure. If no leakage from the regulator is desired until the operating pressure is obtained, then the position of the seat member 36 with respect to the valve member 44 should be in the position as shown in dashed lines in FIG. 3 when the desired regulator operating pressure is within the actuator chamber 69.

Although the construction of the regulator valve 22 minimizes the need for replacement or repair, the uncomplicated structural features of the regulator 22 facilitate ease of repair and/or replacement of the seat member 36 and the sealing member 44. For example, the sealing member 44 may be replaced without substantial disassembly of the actuator housing 56 by simply removing the ring 66 from the body 26, thus exposing the valve member 42 for removal and/or replacement. Since the diaphragm 58 does not undergo severe cyclical conditions, it does not need to be replaced often. Alternative technologies components, such as a Bellville spring, may be used in place of the diaphragm 58 in order to impose the desired biasing force against the piston 62 and valve member 42. A fluid operated actuator is preferred, however, to minimize the size of the actuator. Moreover, control of a fluid operated regulator as disclosed herein is easily obtained.

In addition to being able to selectively adjust the axial position of the seat member 36 relative to the central body axis for limiting movement of the sealing member 44 in engagement with the seating bore 38, the seat member 36 may also be easily repaired and/or replaced simply by removing the cap housing 76 from the body 26 and reversing the steps necessary to selectively fix the seat member 36 for operation.

Those skilled in the art will appreciate from the foregoing description that the regulator is mechanically uncomplicated and yet is provided with improved operating characteristics which are particularly desirable for applications in regulating pressures in relatively high pressure hydraulic applications. Moreover, various substitutions and modifications may be made to the specific structural features and components of the regulator described herein without departing from the scope and spirit of the invention which is defined by the claims.

What is claimed is:

1. A high pressure regulator for improved regulation of a pressurized fluid in a conduit, the regulator comprising:

a body having a longitudinal bore therethrough surrounding a central body axis, the longitudinal bore including a valve member end and an axially opposing fluid outlet end, a shoulder surface surrounding the valve member end of the longitudinal bore, and an inlet passageway providing fluid communication between the conduit and the longitudinal bore;

a seat member secured to the body and positioned adjacent the opposing fluid outlet end of the longitudinal bore in the body, the seat member having a seating bore therethrough surrounding a central seating bore axis, the seating bore providing fluid communication between the inlet passageway and the fluid outlet end of the longitudinal bore;

a valve member axially moveable within the valve member end of the longitudinal bore, the valve member including a sealing member and an axially opposing flange member, the sealing member adapted for sealing with the seat member to at least substantially restrict fluid flow from the inlet passageway to the opposing fluid outlet end, and the flange member adapted to engage the shoulder surface on the body for limiting movement of the sealing member relative to the seat member;

an annular seal for sealing between the valve member and the body; and an actuator connected to the body for exerting a biasing force on the valve member to force the valve member toward the seat member, such that increased fluid pressure in the longitudinal bore biases the valve member away from the seat member.

2. The high pressure regulator as defined in claim 1, further comprising:

an adjustment member for adjusting the axial position of the seat member with respect to the body.

3. The high pressure regulator as defined in claim 2, wherein the adjustment member comprises:

external threads on the seat member for mating engagement with the internal threads on the body; and a securing member for rotatably locking the seat member to the body.

4. The high pressure regulator as defined in claim 1, wherein the sealing member on the valve member has a tapered conical exterior surface, the tapered conical exterior surface being inclined relative to the central seating bore axis at an angle of less than 10 degrees.

5. The high pressure regulator as defined in claim 4, wherein the seating bore has a frustroconical internal surface configured for sealing engagement with the sealing member of the valve member, the axial length of the sealing member in sealing engagement with the seat member being at least 50% of a nominal diameter of the valve member in sealing engagement with the annular seal.

6. The high pressure regulator as defined in claim 4, wherein the seating bore has an inlet port in fluid communication with the inlet passageway in the body and an outlet port in fluid communication with the fluid outlet end of the longitudinal bore, the seating bore having a taper between the inlet port and the outlet port for sealing engagement with the valve member, the outlet port having a crosssection in a plane perpendicular to the central seating bore axis less than 10% of a crosssection of the valve member in sealing engagement with the annular seal in a plane perpendicular to the central body axis.

7. The high pressure regulator as defined in claim 1, wherein:

the shoulder surface of the body being a planar shoulder surface lying within a plane substantially perpendicular to the central body axis; and the flange member on the valve member having a planar flange surface for planar engagement with the planar shoulder surface.

8. The high pressure regulator as defined in claim 1, further comprising:

a cap housing connected to the body and having a cap passageway therein in fluid communication with the opposing fluid outlet end of the longitudinal bore in the body, the cap housing having an interior deflection surface passing through the central seating bore axis for deflecting fluid from the seating bore, and the cap housing having an outlet passage spaced radially from the central seating bore axis for releasing fluid from the cap passageway.

9. The high pressure regulator as defined in claim 8, wherein the cap housing comprises:

a cap connected to the body and having the cap passageway herein; and a plug removably secured to the cap, the plug having an end surface defining the interior deflection surface of the cap housing.

10. The high pressure regulator as defined in claim 9, wherein the plug includes a plug bore extending to an outer surface of the plug, the entirety of the plug bore being spaced from the end surface, the plug bore having a plug bore axis substantially inclined relative to the central seating bore axis, such that the plug bore detects erosion of the plug due to pressurized fluid engaging the end surface.

11. The high pressure regulator as defined claim 8, wherein the cap housing has an outlet passage axis substantially perpendicular to the central seating bore axis.

12. A high pressure regulator for improved regulation of pressurized fluid in a conduit, the regulator comprising:

a body having a longitudinal bore therethrough surrounding a central body axis, the longitudinal bore including a valve member end and an axially opposing fluid outlet end, a planar shoulder surface surrounding the valve member end of the longitudinal bore, and an inlet passageway providing fluid communication between the conduit and the longitudinal bore;

a seat member secured to the body and positioned adjacent the opposing fluid outlet end of the longitudinal bore in the body, the seat member having a seating bore therethrough surrounding a central seating bore axis, the seating bore providing fluid communication between the inlet passageway and the fluid outlet end of the longitudinal bore;

an adjustment member for adjusting the axial position of the seat member with respect to the body;

a valve member axially moveable within the valve member end of the longitudinal bore, the valve member including a sealing member and an axially opposing flange member, the sealing member adapted for sealing with the seat member to at least substantially restrict fluid flow from the inlet passageway to the opposing fluid outlet end, and the flange member having a mating surface for planar engagement with the shoulder surface on the body to limit movement of the sealing member for engagement with the seat member;

an annular seal for sealing between the valve member and the body; and an actuator connected to the body for exerting a biasing force on the valve member to force the valve member toward the seat member, the actuator including an actuator housing secured to the body, a flexible diaphragm disposed within the actuator housing for exerting the biasing force on the valve member, and an inlet port for inputting a selected fluid pressure within the actuator housing for acting on the diaphragm.

13. The high pressure regulator as defined in claim 12, wherein the actuator further comprises:

a piston movable within the actuator housing, the diaphragm acting on the piston and the piston acting on the valve member to bias the valve member toward the seat member.

14. The high pressure regulator as defined in claim 13, wherein the actuator further comprises:

a stop member for limiting movement of the piston with respect to the body.

15. The high pressure regulator as defined in claim 12, wherein the sealing member on the valve member has a tapered conical exterior surface, the tapered conical exterior surface being inclined relative to the central seating bore axis at an angle of less than 10°.

16. The high pressure regulator as defined in claim 12, wherein the seating bore has a frustroconical internal surface configured for sealing engagement with the sealing member of the valve member, the axial length of the sealing member in sealing engagement with the seat member being at least 50% of a nominal diameter of the valve member in sealing engagement with the annular seal.

17. The high pressure regulator as defined in claim 12, wherein the seating bore has an inlet port in fluid communication with the inlet passageway of the body and an outlet port in fluid communication with the fluid outlet end of the longitudinal bore, the seating bore having a taper between the inlet port and the outlet port for sealing engagement with the valve member, the fluid outlet port having a crosssection in a plane perpendicular to the central seating bore axis less than 10% of a crosssection of the valve member in sealing engagement with the annular seal in a plane perpendicular to the central body axis.

18. The high pressure regulator as defined in claim 12, wherein the adjustment member comprises:

external threads on the seat member for mating engagement with the internal threads on the body; and a securing member for rotatably locking the seat member to the body.

19. The high pressure regulator as defined in claim 12, further comprising:

a cap housing connected to the body and having a cap passageway therein in fluid communication with the opposing fluid outlet end of the longitudinal bore in the seat member, the cap housing having an interior deflection surface spaced along the central seating bore axis for deflecting fluid from the seating bore, an outlet passageway spaced radially from the central seating bore axis for releasing fluid from the cap passageway, and a plug bore extending to an outer surface of the cap housing, the entirety of the plug bore being spaced from the interior deflection surface and having a bore axis substantially inclined relatively to the central seating bore axis such that the plug bore detects erosion due to pressurized fluid engaging the interior deflection surface.

20. A method of regulating fluid in a conduit with a regulator including a body having a longitudinal bore therethrough surrounding a central body axis, the longitudinal bore including a valve member end and an axially opposing fluid outlet end, an inlet passageway providing fluid communication between the conduit and the longitudinal bore, a seat member secured to the body and positioned adjacent the opposing fluid outlet end of the longitudinal bore in the body, the seat member having a seating bore therethrough surrounding a central seating bore axis, the seating bore providing fluid communication between the inlet passageway and the fluid outlet end of the longitudinal bore, a valve member axially moveable within the valve member end of the longitudinal bore, the valve member including a sealing member adapted for sealing with the seat member to at least substantially restrict fluid flow from the inlet passageway to the opposing fluid outlet end, an annular seal for sealing between the valve member and the body, and an actuator connected to the body for exerting a biasing force on the valve member to force the valve member toward the seat member, the method comprising:

selectively adjusting the axial position of the seat member with respect to the body; and automatically limiting movement of the sealing member for engagement with the seat member by the engagement of a flange member on the valve member with a shoulder surface on the body.

21. The method as defined in claim 20, further comprising:

providing external threads on the seat member for mating engagement with internal threads on the body; and rotatably locking the seat member to the body.

22. The method as defined in claim 20, further comprising:

connecting a cap housing to the body, the cap housing having a cap passageway therein in fluid communication with the opposing fluid outlet end, an interior deflection surface passing through the central seating bore axis for deflecting fluid from the seating bore, and an outlet passage spaced radially from the central seating bore axis for releasing fluid from the cap passageway.

23. The method as defined in claim 22, further comprising:

removably securing a plug to a cap of the housing, the plug having an end surface defining the internal deflection surface of the cap housing.

24. The method as defined in claim 23, further comprising:

the plug including a plug bore extending to an outer surface of the plug, the entirety of the plug bore being spaced from the end surface; and detecting the release of fluid from the plug bore to detect erosion of the plug due to pressurized fluid engaging the end surface.

25. A cap housing for interconnection with a high fluid pressure body including a longitudinal bore therethrough surrounding a central body axis, a seat secured to the body and having a seating bore surrounding the central body axis, a valve member moveable within the bore for sealing engagement with a seat, and a fluid outlet from the high fluid pressure body, a cap housing comprising:

a cap passageway therein in fluid communication with the fluid outlet from the high pressure fluid body;

an interior deflection surface spaced along the central body axis for deflecting fluid from the fluid outlet;

an outlet passageway spaced radially from the central body axis for releasing fluid from the cap passageway; and a plug bore extending to the outer surface of the cap housing, the entirety of the plug bore being spaced from the end surface and having a bore axis substantially inclined relatively to the central body axis such that the plug bore detects erosion of the cap housing due to pressurized fluid engaging the interior deflection surface.

26. The cap housing as defined in claim 25, wherein the cap housing comprises:

a cap connected to the body and having the cap passageway therein; and a plug removably secure to the cap, the plug containing the interior deflection surface and the plug bore.

27. The cap housing as defined in claim 26, wherein the cap housing has an outlet passageway axis perpendicular to the central body axis.

* * * * *